Dec. 6, 1960 J. S. FERM 2,963,053

COMPONENT LEAD FORMER

Filed Aug. 27, 1959

INVENTOR
Joseph S. Ferm

By Willard M. Graham
Agent.

2,963,053

COMPONENT LEAD FORMER

Joseph S. Ferm, Huntington Beach, Calif., assignor to Northrop Corporation, Beverly Hills, Calif., a corporation of California Filed Aug. 27, 1959, Ser. No. 836,469

4 Claims. (Cl. 140—123)

This invention has to do with a tool and more particularly a tool that has for its purpose the forming of wire, or metal leads of an electrical component. Further, it is a continuation-in-part of the patent application bearing Serial No. 709,971, filed January 20, 1958, and having the title "A Tool" and the inventor also being Joseph S. Ferm.

Printed circuits, as now visualized, demand rugged and precise construction in order to prevent complete failure of operation of the particular circuit involved. Components such as resistors, capacitors and the like, that must have their leads accurately formed have them inserted through precisely located openings in a board that may or may not have conductor strips on both sides. There are several requirements that must be fulfilled in preparing the component leads: they should not be formed more than once to prevent fatigue; compression, stretch and shear forces on the leads, except where desired, must not occur in order to prevent component damage.

The tool that is to provide the preceding results should be constructed in such a manner that repeatable precision results will be obtained with skilled, semi-skilled and unskilled labor, and component output should be considerably increased over the laborious hand forming method.

An object of this invention is to provide a tool that will precisely and accurately form the leads of an electrical component without imposing compression, stretch or shear forces.

Another object of this invention is to provide a tool that may be readily and economically fabricated; that may be used by unskilled labor; that will withstand a considerable amount of abuse without impairing its operation or accuracy.

Briefly the invention comprises structure for properly holding an electrical component, such as a resistor, which has opposed electrical leads. A pair of jaws actuated by a pair of handles engages the leads and forces them to bend about a die resulting in the proper precise form being established. At the same time that part of the leads that may be considered excess material is sheared.

Figures 1, 2, 3, 4, 5, 6:
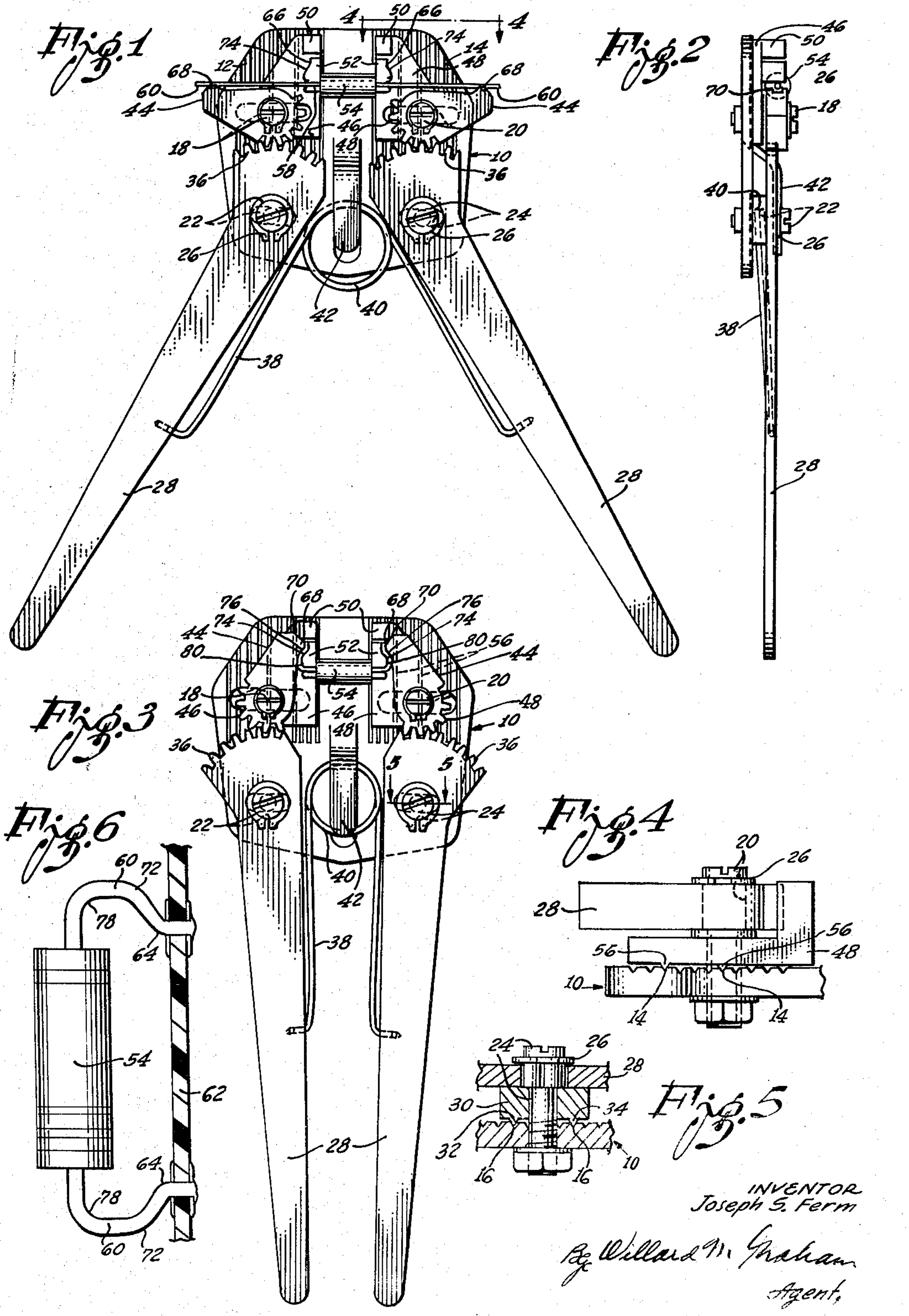
Figure 1 is a front view of the tool illustrating and having embodied therein the present invention and showing the structure in a position to receive an electrical component.
Figure 2 is a side elevation view of the tool illustrating lead forming structure.
Figure 3 is a view similar to Figure 1 but illustrating the structure in the actuated position.
Figure 4 is a fragmentary, cross-sectional view taken on line 4—4 of Figure 1.
Figure 5 is a fragmentary, cross-sectional view taken on line 5—5 of Figure 3.
Figure 6 is a view of a mounted electrical component that has had the leads formed by the tool.

Referring to the drawings for a more detailed description of the present invention 10 identifies a mounting or retaining plate. Formed in and constituting an integral part of plate 10 are two spaced groups of a plurality of parallel grooves 12 and 14. The grooves, as may be determined by referring to Figures 1 and 3, are located on the upper quarters of the substantially square plate 10. There is similar but smaller group of spaced grooves integral with the plate 10 and located in the lower corners or quarters of the plate; only one group 16 being shown in Figure 5. Plate 10 has four elongated openings therethrough to receive shafts or fasteners 18, 20, 22, and 24. To prevent inadvertent removal of the fasteners or shafts from the plate, lock or snap washers 26 are provided. The fasteners or shafts may be moved back and forth in the openings in order to adjust and alter the position of structure attached thereto.

Handles 28 are on and rotatable about shafts 22 and 24. Positioned between each handle and the plate 10 is a spacer 30. Integral with the spacer is at least one rib or elongated projection. As illustrated two ribs 32 and 34 are provided. These ribs are received in any one of the corresponding groups of grooves 16. Each handle has a partial spur gear 36 integral therewith.

Removably attached to each of the handles 28 is the free end of a compression spring 38 which has for its purpose the urging of the handles in the one direction illustrated in Figure 1. The coil 40 of the compression spring is located under a tongue 42 that is struck from the central portion of plate 10.

Identical jaws 44 are on and rotate about shafts 18 and 20. Each jaw has a partial spur gear 46 integral therewith that meshes with the corresponding spur gear on the respective handle. As a result of this arrangement of parts, movement of handles 28 causes the jaws 44 to assume the extended position shown in Figure 1 or the closed position illustrated in Figure 3.

Located between each jaw 44 and the plate 10 and held attached to the plate by fasteners 18 and 20 is a die 46 and 48. Attention is directed to Figures 1 and 3 where a detail of the dies may be seen. The two dies are mirror images; therefore only one will be described. Each die is generally a right triangle with the vertical side of each die facing the opposing vertical side. A pair of bosses are integral with and adjacent the straight side of each die. One boss 50 is substantially square and the other 52 is irregular as may be seen by referring to the figures. The interior distance between the straight sides of each die is sufficient to receive the body 54 of an electrical or electronic component. Additionally on the back of each die is at least one elongated rib or projection 56 that is received in any of the corresponding grooves. Figure 4 illustrates two projections or ribs, but only one is necessary. As a result of this cooperating structure the dies can be moved toward and away from each other. The boss 52 has a notch or groove 58 therein to receive the wire leads 60 of the electrical component. The notch is just sufficient to provide room for inserting the leads 60.

Attention is directed to Figure 1. The body 54 of the component as well as the leads 60 can only be inserted in their proper location when the jaws 44 are in the position illustrated in Figure 1.

Formation of the leads 60 is critical and very important. The distance between the free ends of the leads 60 is controlled by the outside configuration of the bosses 52. The electronic component is mounted and soldered in a printed circuit card or board 62 as illustrated in Figure 6. The board, as stated, has openings therethrough to receive the free ends of the leads 60. It may be stated that the distance between the free ends of the leads 60 is slightly greater than the distance between the centers of the openings in the board 62. The reason being that the leads must be squeezed a slight amount in order for them to be inserted, and the tendency to spring back to the formed shape provides greater retention when in place prior to soldering.

The distance from the free ends of each lead 60 to the first bend 64 is controlled and the depression 66 formed in each die 52 is the controlling factor. The depression 66 not only receives a portion of the lead 60, but also receives the forming face 68 of each jaw 44. The forming face 68 in cooperation with the upper surface 70 of each jaw provides a knife edge that cooperates with the die 50 to sever the excess lead material.

The bend 64 of the leads 60 is the reference or indexing point for the electronic component. In other words, the bend 64 determines the distance of the body 54 of the component from the board 62. Therefore, it may be stated that the distance the free ends of the leads 60 extend through the board 62 is also controlled.

The distance from the first bends 60 to the next bends 72 is controlled by the inclined surfaces 74 on the dies that function in cooperation with the inclined surfaces 76 on the jaws 44.

Also the distance between bends 72 of the leads to bends 78 is controlled by surfaces 80 of the dies acting in cooperation with corresponding and complementary surfaces on the jaws 44. Finally, the distance between bends 78 and the component body 54 is controlled by the distance surfaces 80 are from the body 54.

Attention is directed to this additional fact. The jaws 44 do not impose any shear stretch or compression force, except where desired, on the leads 60. This result is accomplished by the fact that the leads 60 merely rest on the jaws 44 as illustrated and that when the jaws form the leads the forces are absorbed by dies 46 and not by the body 54. For instance, the jaws 44 first cause a forming of the leads 60 about surface 80. The movement of the jaws, subsequently, is all upward and inward but surface 80 absorbs all the forces.

Briefly the operation of the device is as follows: The tool is held in the hand with the jaws 44 extended as illustrated in Figure 1. The component body 54 is inserted between the dies 46 and 48 with the leads 60 being received in slots 58 and resting on jaws 44. The handles 28 are squeezed together resulting in the jaws 44 moving toward the position illustrated in Figure 3. As a result, the leads 60 are formed about the dies 46 and 48 to provide the configuration illustrated in Figure 6.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A tool comprising a plate having a plurality of parallel grooves formed therein; a pair of spring loaded pivotal members on said plate; a spaced pair of pivotal elements interconnected to and actuated by said members; and means between said elements into which is inserted an electrical component and about which wire leads of the component are formed; said means having at least one projection thereon that is received by said grooves.

2. A tool comprising a plate having two spaced groups of a plurality of parallel grooves formed therein; a pair of spaced apart means on said plate into which is inserted an electrical component and about which wire leads of the component are formed; each of said means having at least one projection thereon that is received by the grooves of the corresponding group; a pair of spring loaded pivotal members on said plate; and a spaced pair of wire leads engaging and forming pivotal elements on said plate interconnected to and actuated by said members.

3. A tool comprising a plate having a plurality of grooves and a pair of spaced apart elongated openings formed therein; a pair of spring loaded pivotal members on said plate; a spaced pair of pivotal elements interconnected to and actuated by said members; means between said elements into which is inserted an electrical component and about which wire leads of the component are formed; a fastener extending through said elongated opening for attaching said elements and means to said plate; said means having at least one projection thereon that is received by said grooves.

4. A tool comprising a plate having two spaced groups of a plurality of parallel grooves and a pair of spaced apart elongated openings formed therein; a pair of spaced apart means on said plate into which is inserted an electrical component and about which wire leads of the component are formed; each of said means having at least one projection thereon that is received by the grooves of the corresponding group; a pair of spring loaded pivotal members on said plate; a spaced pair of wire leads engaging and forming pivotal elements on said plate interconnected to and actuated by said members; and a fastener extending through said elongated opening for attaching said elements and means to said plate.

References Cited in the file of this patent

UNITED STATES PATENTS

| | | |
|---|---|---|
| 823,367 | Rayan | June 12, 1906 |
| 1,105,191 | Flora et al. | July 28, 1914 |
| 1,670,201 | McGary | May 15, 1928 |
| 1,722,279 | Davis | July 30, 1929 |
| 2,324,415 | Moss | July 13, 1943 |